US009262555B2

(12) United States Patent
Coalson et al.

(10) Patent No.: US 9,262,555 B2
(45) Date of Patent: Feb. 16, 2016

(54) MACHINE FOR RECOGNIZING OR GENERATING JABBA-TYPE SEQUENCES

(71) Applicant: Yahoo! Inc., Sunnyvale, CA (US)

(72) Inventors: Josh Coalson, San Jose, CA (US); Muxin Zhou, Beijing (CN)

(73) Assignee: Yahoo! Inc., Sunnyvale, CA (US)

( * ) Notice: Subject to any disclaimer, the term of this patent is extended or adjusted under 35 U.S.C. 154(b) by 132 days.

(21) Appl. No.: 13/843,292

(22) Filed: Mar. 15, 2013

(65) Prior Publication Data

US 2014/0280358 A1  Sep. 18, 2014

(51) Int. Cl.
*G06F 17/00* (2006.01)
*G06F 17/30* (2006.01)

(52) U.S. Cl.
CPC .... *G06F 17/30985* (2013.01); *G06F 17/30958* (2013.01)

(58) Field of Classification Search
CPC .............. G06F 9/4416; G06F 11/1076; G06F 11/3608; G06F 11/3636; G06F 12/023; G06F 13/1663
USPC ........................................................ 707/716
See application file for complete search history.

(56) References Cited

U.S. PATENT DOCUMENTS

| 5,610,812 | A | 3/1997 | Schabes et al. |
| 6,910,004 | B2 | 6/2005 | Tarbouriech et al. |
| 7,702,508 | B2 | 4/2010 | Bennett |
| 8,473,442 | B1 | 6/2013 | Deninger et al. |
| 2003/0187633 | A1* | 10/2003 | Fairweather ...................... 704/9 |
| 2005/0283507 | A1* | 12/2005 | Souvignier et al. ........... 708/250 |
| 2007/0271255 | A1 | 11/2007 | Pappo |
| 2008/0114738 | A1 | 5/2008 | Chao |
| 2009/0182644 | A1 | 7/2009 | Panagopulos et al. |
| 2011/0173174 | A1 | 7/2011 | Flitcroft |

OTHER PUBLICATIONS

U.S. Appl. No. 13/842,826, filed Mar. 15, 2013, 80 pages.
U.S. Appl. No. 13/842,826: Filing Receipt, mailed May 10, 2013, 3 pages.
U.S. Appl. No. 13/842,826: Notice to File Missing Parts, mailed May 10, 2013, 2 pages.
U.S. Appl. No. 13/842,826: Response to Pre-Exam Formalities Notice, filed Jun. 20, 2013, 3 pages.
U.S. Appl. No. 13/842,826: Filing Receipt, mailed Jul. 2, 2013, 3 pages.
U.S. Appl. No. 13/842,826: Notice of Publication, mailed Sep. 18, 2014.
U.S. Appl. No. 13/843,666, filed Mar. 15, 2013.
U.S. Appl. No. 13/843,666: Notice to File Missing Parts, mailed May 10, 2013, 2 pages.
U.S. Appl. No. 13/843,666: Filing Receipt, mailed May 10, 2013, 3 pages.
U.S. Appl. No. 13/843,666: Response to Pre-Exam Formalities Notice, filed Jun. 24, 2013, 60 pages.
U.S. Appl. No. 13/843,666: Filing Receipt, mailed Jul. 2, 2013, 3 pages.

(Continued)

*Primary Examiner* — Truong Vo (74) *Attorney, Agent, or Firm* — Berkeley Law & Technology Group, LLP (57) ABSTRACT

Example methods, apparatuses, or articles of manufacture are disclosed that may be implemented, in whole or in part, using one or more computing devices to facilitate or otherwise support one or more processes or operations for a machine for recognizing or generating one or more Jabba-type sequences.

20 Claims, 6 Drawing Sheets

(56) References Cited

OTHER PUBLICATIONS

U.S. Appl. No. 13/843,666: Notice of Publication, mailed Sep. 18, 2014, 1 page.
U.S. Appl. No. 13/842,826: Non-Final Rejection and Examiner's Search Strategy, mailed Mar. 20, 2015, 21 pages.
U.S. Appl. No. 13/843,666: Non-Final Rejection and Examiner's Search Strategy, mailed Mar. 24, 2015, 22 pages.
U.S. Appl. No. 13/842,826: Amendment/Req Reconsideration After Non-Final Rejection, filed Jun. 22, 2015, 16 pages.
U.S. Appl. No. 13/842,826: Final Rejection, mailed Jul. 20, 2015, 25 pages.
U.S. Appl. No. 13/843,666: Amendment/Req Reconsideration After Non-Final Rejection and Amendments, filed Jul. 24, 2015, 15 pages.
U.S. Appl. No. 13/844,013: Amendment/Req Reconsideration After Non-Final Rejection and Amendments, filed Jul. 24, 2015, 9 pages.

* cited by examiner

MACHINE FOR RECOGNIZING OR GENERATING JABBA-TYPE SEQUENCES

BACKGROUND

1. Field

The present disclosure relates generally to search engine content management systems, and, more particularly, to a machine for recognizing or generating Jabba-type sequences for use in or with search engine content management systems.

2. Information

The Internet is widespread. The World Wide Web or simply the Web, provided by the Internet, is growing rapidly, at least in part, from the large amount of content being added seemingly on a daily basis. A wide variety of content, such as one or more electronic documents, for example, is continually being identified, located, retrieved, accumulated, stored, or communicated. Various information databases including, for example, knowledge bases or other collections of content, Web-based or otherwise, have become commonplace, as have related communication networks or computing resources that help users to access relevant information. Effectively or efficiently identifying or locating content of interest may facilitate or support information-seeking behavior of users and may lead to an increased usability of a search engine.

With a large amount of content being available, a number of tools may often be provided to allow for copious amounts of information to be searched through in an efficient or effective manner. For example, service providers may allow users to search the Web or other networks, databases or like data repositories using search engines. In some instances, to facilitate or support one or more processes or operations of a search engine, a finite state machine (FSM) may, for example, be employed. An FSM may typically refer to a model of behavior comprising a finite number of states, transitions between states, as well as associated outputs or actions. In some instances, an FSM may be represented via a suitable data structure, such as a graph, for example, with vertices corresponding to states of an FSM, and edges corresponding to transitions between FSM states due to one or more inputs. A search engine-related application of an FSM may include, for example, text processing or matching, in which the machine may function as a sequence recognizer. At times, however, a number of possible sequences to be matched for a given input may grow relatively large due, at least in part, to a number of repetitive or unnecessary graph traversals, which may make matching tasks more labor-intensive or error-prone.

BRIEF DESCRIPTION OF THE DRAWINGS

Non-limiting and non-exhaustive aspects are described with reference to the following figures, wherein like reference numerals refer to like parts throughout the various figures unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be used, in whole or in part, to facilitate or support one or more processes or operations for a machine for recognizing or generating one or more Jabba-type sequences. Briefly, Jabba is a novel language for matching or generating sequences of text, such as structured text, for example, as well as for associating actions to one or more match events. For purposes of explanation, somewhat similarly to how regular expressions (RE) match sequences of characters or specify actions (e.g., store matched segments in pattern buffers, etc.), Jabba language or "Jabba" may be used, at least in part, to match sequences of atoms as well as associate relatively complex actions with one or more suitable match processes. As used herein, "Jabba atoms" or simply "atoms" may be used interchangeably and may refer to one or more text fragments that may be classified or tagged with one or more attributes. An atom may comprise, for example, a structured text fragment, such as a string of text, a class that may also be represented via a string (e.g., "place_name," etc.), a set of key-value attributes (e.g., "place_type"="city", "is_unique"=false, etc.), or any combination thereof. It should be appreciated that in some instances, JavaScript Object Notation (JSON)-type string syntax may, for example, be employed, such as if appropriate or applicable. Thus, at times, an attribute may comprise, for example, a string key associated with a JSON value. Claimed subject matter is not limited to a particular implementation, of course.

It should also be noted that even though one or more techniques are described herein in connection with a text processing or matching application, techniques or any aspects thereof may be implemented in connection with any suitable application without deviating from the scope of claimed subject matter and are not limited to a particular taxonomy illustrated herein. For example, it will be understood by skilled artisans that application-specific terms, such as "span," "interpretation," "decoration," etc. may be used interchangeably with analogous or equivalent Jabba terms, such as "atom," "atom sequence," "attribute," etc., respectively. To illustrate, as will be seen, Jabba matching semantics may, for example, be characterized or specified in terms of "atoms" as well as "spans" (e.g., broadly). The former may reference an abstract representation of structured or annotated text, such as while describing Jabba language, for example, and the latter may reference an application-specific implementation of an atom, such as while describing an atom, which maps to a classified fragment of a search query. Again, these are merely examples relating to usage of terms to which claimed subject matter is not limited.

Depending on an implementation, a Jabba rule may, for example, be built up or created from a Boolean match expression that may facilitate or support matching one or more aspects of a candidate atom. For ease of understanding, a Jabba atom may be conceptually thought of as a structural equivalent of a character in RE, and a Jabba rule may be thought of as a named equivalent of an RE pattern. Likewise, Jabba match expressions may, for example, be conceptualized as characters or character classes in RE patterns, for example, except that Jabba match expressions may comprise arbitrary Boolean functions on different parts of a candidate atom. As a way of illustration, the search query "London pictures" may be tokenized via one or more appropriate techniques, processed via a suitable entity recognizer, and broken into a sequence of two Jabba atoms as, for example:

```
"london" class="place"
        attributes={"type":"city","unique":false}
"pictures" class="token" attributes={ }
```

Jabba actions may, for example, cause callbacks to a client to be invoked. For example, one or more callbacks may be specified via Jabba to map one or more Jabba actions into application-specific functionality. If a match is found, for example, a client may receive a callback comprising a name of a Jabba rule that matched as well as all triggered actions. Although claimed subject matter is not necessarily limited in scope in this respect, additional example embodiments or techniques that may be used, at least in part, to match sequences of atoms and associate actions with various match processes via Jabba language (along with related technology) may be discussed in concurrently filed U.S. patent application Ser. No. 13/842,826, titled "JABBA LANGUAGE," filed on Mar. 15, 2013, by Coalson, herein incorporated by reference in its entirety and assigned to the assignee of currently claimed subject matter.

As was indicated, rich or otherwise sufficient matching or action semantics may allow Jabba to be advantageously integrated into a number of text processing or matching applications. For example, Jabba may be used, at least in part, to specify one or more sequences or actions for structured text processing, just to illustrate one possible implementation. Typically, although not necessarily, to process or "run" structured text through applicable patterns, an execution environment may, for example, be needed or otherwise useful. As will be described in greater detail below, in some instances, an execution environment may include, for example, a finite state machine (FSM) utilized in connection with an on-line search performed via a suitable search engine. As used herein, "on-line" may refer to a type of a communication that may be implemented electronically via one or more communications networks, such as, for example, the Internet, an intranet, a communication device network, or the like. Communications networks may comprise, for example, a wireless network, wired network, or any combination thereof.

Briefly, a search engine may typically comprise a computing platform that may, for example, help a user to locate, retrieve, match, etc. content of interest. In some instances, content may include, for example, on-line content, such as one or more web documents of a particular interest. As used herein, "web document" or "electronic document" may be used interchangeably and may refer to one or more digital signals, such as communicated or stored signals, for example, representing a source code, text, image, audio, video file, or the like. As a way of illustration, web documents may include a web page, a news feed, a rating or review post, a status update, a portal, a blog, an e-mail, a text message, an Extensible Markup Language (XML) document, a web page pointed to by a Uniform Resource Locator (URL), a collection of user-generated content, etc., just to name a few examples. At times, web documents may include one or more embedded references or hyperlinks to images, audio or video files, or other web documents. One common type of reference may comprise, for example, a URL.

In some instances, text patterns associated with web documents may, for example, be matched to a search query or like text input via one or more processing operations in connection with a suitable search engine, such as an on-line search engine, pattern-matching search engine, etc., or any combination thereof. For example, a search engine may interpret one or more provided syntax rules and may perform one or more matching operations with respect to a target character string, buffer, file, web document, etc. Search results of one or more matching operations may comprise, for example, one or more web documents presented to a user (e.g., via a graphical user interface) in an ascending or descending order of relevance. In some instances, search results may comprise, for example, one or more "match" or "no-match" values representative of respective "found" or "not found" Boolean results. Of course, these are merely details relating to search engines and claimed subject matter is not so limited.

As alluded to previously, in some instances, an FSM may be implemented as a sequence recognizer utilizing one or more sequences of text as input to find one or more rules that match that input. At times, employing a sequence recognizer alone to find all possible matching sequences, however, may involve generating all possible sequences and feeding them through the recognizer. This may be time-consuming or computationally-expensive. For example, a number of possible sequences may grow quite large for relatively small sets of text fragments, and many repetitive passes or trips through parts or portions of an FSM-associated graph may cause run time to be unnecessarily high. Accordingly, it may be desirable to develop one or more methods, systems, or apparatuses that may allow for more effective or efficient development of matching tasks while minimizing a number of repetitive or unnecessary graph traversals, for example.

Thus, as will be described in greater detail below, a suitable FSM, such as a Jabba-type machine, for example, may be implemented as a sequence recognizer as well as a sequence generator. For example, one or more Jabba rules may be parsed or compiled into a suitable in-memory representation, and a Jabba-type machine may be constructed from such a representation. A Jabba-type machine may be subsequently used, in whole or in part, by a suitable client to match one or more sequences of atoms, for example, or generate matching sequences from sets of atoms.

Figure 1:
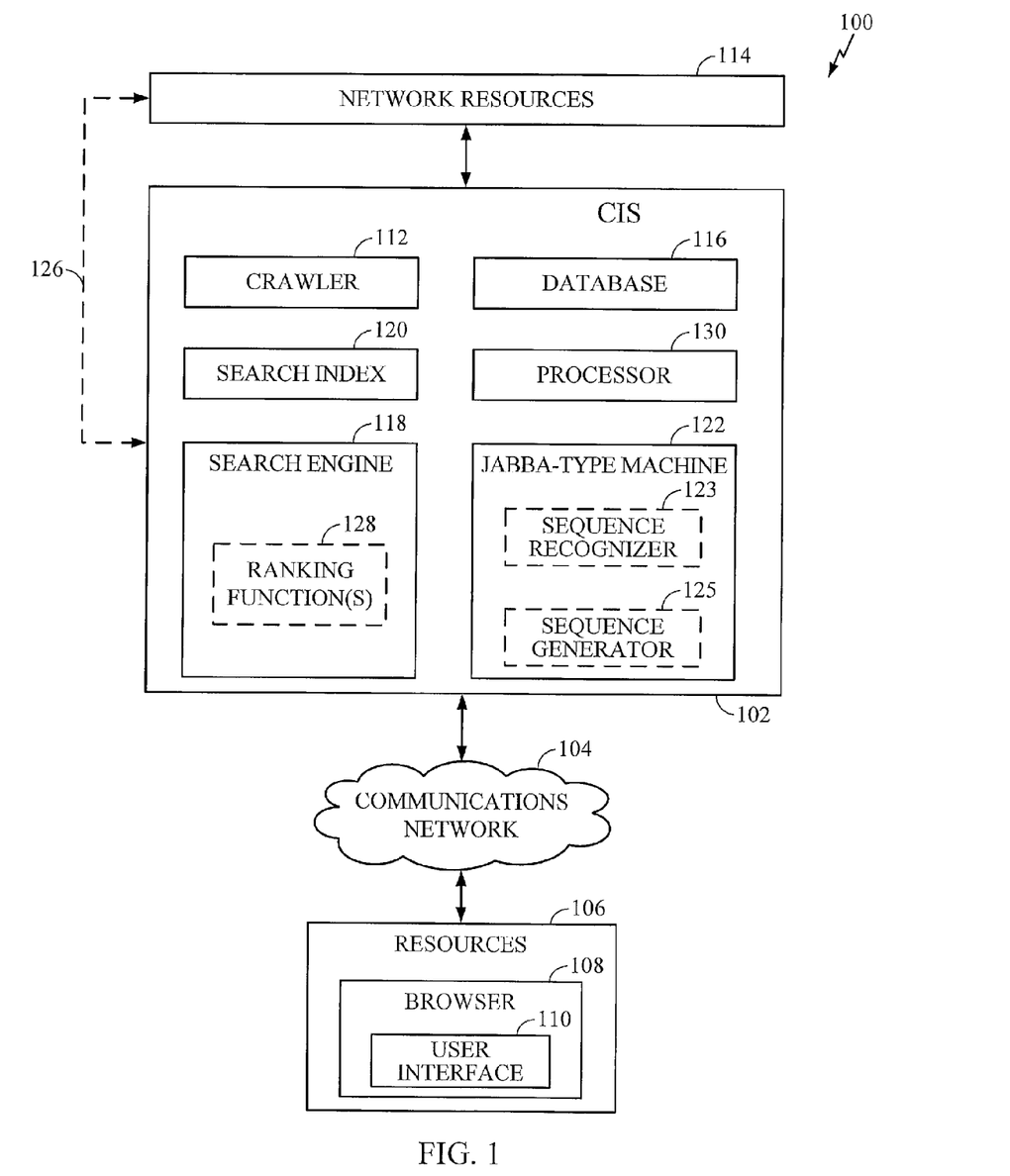
FIG. 1 is a schematic diagram illustrating certain features of an implementation of an example computing environment.

FIG. 1 is a schematic diagram illustrating certain features of an implementation of an example computing environment 100 capable of facilitating or supporting one or more processes or operations for a machine for recognizing or generating Jabba sequences. Computing environment 100 may be operatively enabled using one or more special purpose computing apparatuses, communication devices, storage devices, computer-readable media, applications or instructions, various electrical or electronic circuitry, components, etc., as described herein with reference to example implementations.

As illustrated, computing environment 100 may include one or more special purpose computing platforms, such as, for example, a Content Integration System (CIS) 102 that may be operatively coupled to a communications network 104 that a user may employ to communicate with CIS 102 by utilizing resources 106. CIS 102 may be implemented in connection with one or more public networks (e.g., the Internet, etc.), private networks (e.g., intranets, etc.), public or private search engines, Real Simple Syndication (RSS) or Atom Syndication (Atom)-type applications, etc., just to name a few examples.

Resources 106 may comprise, for example, one or more special purpose computing client devices, such as a desktop computer, laptop computer, cellular telephone, smart telephone, personal digital assistant, or the like capable of communicating with or otherwise having access to the Internet via a wired or wireless communications network. Resources 106 may include a browser 108 and a user interface 110, such as a graphical user interface (GUI), for example, that may, for example, initiate transmission of a search query or like text input represented via one or more electrical digital signals. User interface 110 may interoperate with any suitable input device (e.g., keyboard, mouse, touch screen, digitizing stylus, etc.) or output device (e.g., display, speakers, etc.) for interaction with resources 106. Even though a certain number of resources 106 are illustrated, it should be appreciated that any number of resources may be operatively coupled to CIS102, such as via communications network 104, for example.

In an implementation, CIS 102 may employ a crawler 112 to access network resources 114 that may include suitable content of any one of a host of possible forms (e.g., web pages, search query logs, status updates, location check-ins, audio, video, image, structured or unstructured text files, etc.), such as in the form of stored or communicated binary digital signals, for example. Crawler 112 may store all or part of a located web document (e.g., a URL, link, etc.) in a database 116, for example. CIS 102 may further include a search engine 118 supported by a suitable index, such as a search index 120, for example, and operatively enabled to search for content obtained via network resources 114. Search engine 118 may, for example, communicate with user interface 110 and may retrieve for display via resources 106 a listing of search results via accessing, for example, network resources 114, database 116, search index 120, etc., such as in response to a search query or like text input. Network resources 114 may include suitable content, as was indicated, such as represented by stored digital signals, for example, accessible via the Internet, one or more intranets, or the like. For example, network resources 114 may comprise one or more web pages, web portals, status updates, electronic messages, databases, or like collection of stored electronic information.

CIS 102 may further include a suitable FSM, such as a Jabba-type machine 122, for example, that may comprise or otherwise be implemented as a sequence recognizer 123 and a sequence generator 125. As described below, in at least one implementation, Jabba-type machine 122 may comprise, for example, a nondeterministic finite automaton (NDFA) capable of triggering or executing one or more Jabba actions on nodes of an associated graph representing match points along a sequence of atoms. As alluded to previously, sequence recognizer 123 may make callbacks for each match, for example, with all the match actions, thus, enabling more sophisticated matching of text than Regular Expressions (RE), Grammar Specification Language (GSL), or like tools. Sequence generator 125 may facilitate or support more effective or efficient finding of all matching sequences for a given set of atoms, for example, without generating any sequences that do not match, as will also be seen. This may provide advantages in many text processing or matching applications, particularly if one or more sequences are not known a priori, for example. In some instances, Jabba-type machine 122 may, for example, implement one or more optimization operations or passes for merging equivalent states and edges of an associated graph. Particular examples of Jabba-type machine 122 will be described in greater detail below with reference to FIG. 2.

At times, it may be potentially advantageous to utilize one or more real-time or near real-time indexing or searching techniques, for example, so as to keep a suitable index (e.g., search index 120, database 116, etc.) sufficiently updated. In this context, "real time" may refer to an amount of timeliness of content, which may have been delayed by, for example, an amount of time attributable to electronic communication as well as other signal processing. For example, CIS102 may be capable of subscribing to one or more social networking platforms, news feeds, location check-in services, or other content, on-line or otherwise, via a content feed 126. In some instances, content feed 132 may comprise, for example, a live feed, though claimed subject matter is not so limited. As such, CIS102 may, for example, be capable of receiving streaming, periodic, or asynchronous updates via a suitable application programming interface (API) associated with network resources 114. In some implementations, network resources 114 may include a suitable pattern-matching library (e.g., C++, etc.), which may provide an application programming interface (API) for compiling one or more suitable Jabba patterns into Jabba-type machine 122, as discussed below.

As previously mentioned, in some instances, it may be desirable to rank retrieved web documents so as to assist in presenting relevant or useful content, such as one or more electronic documents of interest, for example, in response to a search query or like text input. Accordingly, CIS102 may employ one or more ranking functions 128 that may rank search results in a particular order that may be based, at least in part, on keyword, relevance, recency, usefulness, popularity, or the like including any combination thereof. In some instances, ranking functions 128 may, for example, facilitate or support obtaining or providing one or more "match" or "no-match" values representative of respective "found" or "not found" Boolean results, as was also indicated. As seen, CIS102 may further include a processor 130 that may, for example, be capable of executing computer-readable code or instructions, implement suitable operations or processes, etc. associated with example environment 100.

As a way of illustration, in operative use, a user may access a search engine website, such as www.yahoo.com, for example, and may submit or input a search query by utilizing resources 106. Browser 108 may initiate communication of one or more electrical digital signals representing a search query from resources 106 to CIS 102, such as via communications network 104, for example. CIS 102 may, for example, look up search index 120 and may establish a listing of web documents relevant to a search query based, at least in part, on Jabba-type machine 122, ranking function(s) 128, database 116, or the like. CIS 102 may further communicate search results to resources 106, such as for displaying via user interface 110, for example.

Figure 2:
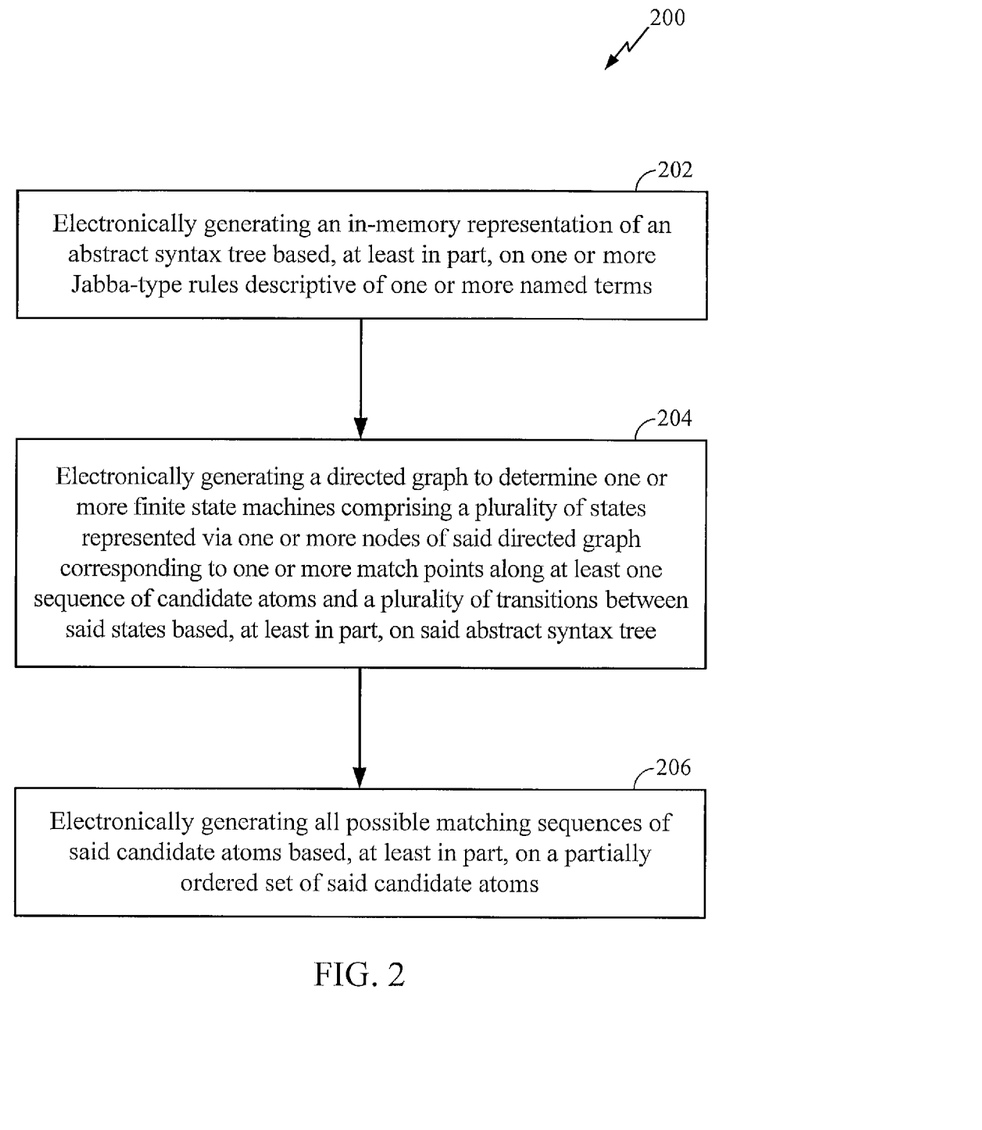
FIG. 2 is a schematic representation of a flow diagram illustrating a summary of an implementation of an example process for a machine for recognizing or generating one or more Jabba-type sequences.

FIG. 2 is a schematic representation of a flow diagram illustrating a summary of an implementation of an example process 200 that may facilitate or support one or more operations or techniques for a machine for recognizing or generating Jabba sequences, such as Jabba-type machine 122 of FIG. 1, for example. It should be noted that electronic information applied or produced, such as, for example, inputs or results associated with process 200 may be represented via one or more digital signals. It should also be appreciated that even though operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 200 may, for example, begin at operation 202 with electronically generating an in-memory representation of an abstract syntax tree (AST) based, at least in part, on one or more Jabba rules descriptive of one or more named terms. For example, in at least one implementation, an optimizing compiler may parse one or more Jabba rules into a suitable AST that may be converted to a suitable code that may evaluate input at each edge of a determined FSM, as will be seen. In certain simulations or experiments, a Jabba parser was implemented as a Bison-type grammar, whose production rules may construct one or more objects in an AST, for example, on top of a Flex-type tokenizer, though claimed subject matter is not so limited. A Bison-type grammar or Flex-type tokenizer are generally known and need not be described here in greater detail.

By way of example but not limitation, in one particular simulation or experiment, a reduction of a Flex-tokenized Jabba rule via the Bison grammar included one illustrated below:

```
IDENTIFIER  =  string +  ;   (string rule)
IDENTIFIER  =  match_expr +  ;   (match_expr rule)
IDENTIFIER  =  term +  ;   (term rule)
IDENTIFIER  =  counted_term  ;   (counted_term rule)
IDENTIFIER  =  expr  ;   (expr rule)
rule     (rule rule)
rules rule    (rules rule, reducing nothing (empty) to rules)
rules    (rules rule)
```

Here, Bison actions (e.g., code snippets, etc.) characterized via each Jabba rule (e.g., for each reduction) may, for example, be capable of generating a suitable parse tree as:

A parse tree may, for example, be converted via one or more Bison actions into an AST whose nodes are objects representing each suitable construct. A Jabba compiler may perform one or more optimization operations on an AST to reduce complexity, for example, and may build a suitable state machine capable of executing a compiled Jabba code against input sequences or graphs of Jabba atoms, as discussed below. Once an AST is constructed, an optimizing pass may, for example, utilize one or more appropriate techniques to reduce complexity while maintaining equivalence. For example, logical-OR constructs with one or more known-true terms may be reduced, as one possible approach. In some instances, a more complex optimization may be performed so as to replace one or more qualifying disjunctions involving a number of string comparisons with a more efficient dictionary-based AST node, for example. Of course, these are merely examples relating to Jabba rules, parser, AST, etc., and claimed subject matter is not so limited.

With regard to operation 204, a directed graph may, for example, be electronically generated to determine one or more FSMs comprising a plurality of states represented via one or more nodes of the graph. In some instances, one or more nodes may correspond to one or more match points along at least one sequence of candidate atoms, for example, and a plurality of transitions between FSM states based, at least in part, on a suitable AST, as discussed above. Transitions may represent possible next states, followed when an edge's associated match expression evaluates to "true" for a candidate atom. Jabba actions may be implemented as triggers and executors on graph nodes, for example, to keep track of the beginning and ending of slots as well as other action elements. In some instances, an FSM may comprise, for example, an NDFA implemented in connection with a standalone pattern-matching C++ library, though claimed subject matter is not so limited. As was indicated, a library may provide an application programming interface (API) to facilitate or support compiling Jabba rules into an NDFA so as to match individual candidate atom sequences or to find all possible matches of a partially ordered set of candidate atoms. If a match is found, for example, a client may receive a callback containing a name of a rule that matched as well as all triggered actions. A client may subsequently decide whether or not to continue finding further matches.

For purposes of explanation, consider, for example, a search query for a hotel-related on-line search. Typically, although not necessarily, such a search query may, for example, begin with some arbitrary number of descriptive terms, such as "affordable", "5 star," etc., followed by a hotel-related business term, such as "hotel", "motel," etc., and may conclude with a city name. At times, a Jabba code for such a pattern may, for example, comprise:

```
hotel = { [ <htl_quality> <htl_price> ]*
          <bz_hotel> in? <city> };
```

For this example, match expressions like "<htl_price>" and "in" may, for example, specify how to match a single span. The term "<htl_price>" may comprise Jabba syntax for matching any span whose class matches what's in the angle brackets, for example. The term "in" may match a token "in". Curly brackets in the above rule may specify an ordered sequence of match expressions, for example, and square brackets may specify alternations. Quantifiers "?", "*" and "+" may have the same or similar meaning as in RE, for example. If a span sequence of an interpretation matches a pattern, a suitable rule, such as the rule "hotel" may, for example, be triggered, and the search query "affordable 5 star hotel in san francisco" may, for example, be matched.

In some instances, useful information may, for example, be extracted from a search query. In Jabba, a slot whose value is an array of one or more spans may, for example, be employed. By way of example, the above rule may be modified so as to add some slotting assignments as:

```
hotel = { [ <htl_quality>#quality
          <htl_price>#price ]* <bz_hotel> in?
          <city>#location };
```

If <htl_quality> is matched in the above search query, Jabba may create a slot called "quality" whose value may correspond to one or more spans in a search query (e.g., "5 star"). The same approach may, for example, be implemented for price and location. Again, additional non-limiting examples of Jabba rules (along with related technology) may be discussed in concurrently filed U.S. patent application Ser. No. 13/842,826, titled "JABBA LANGUAGE," filed on Mar. 15, 2013, by Coalson, herein incorporated by reference in its entirety and assigned to the assignee of currently claimed subject matter.

Figure 3:
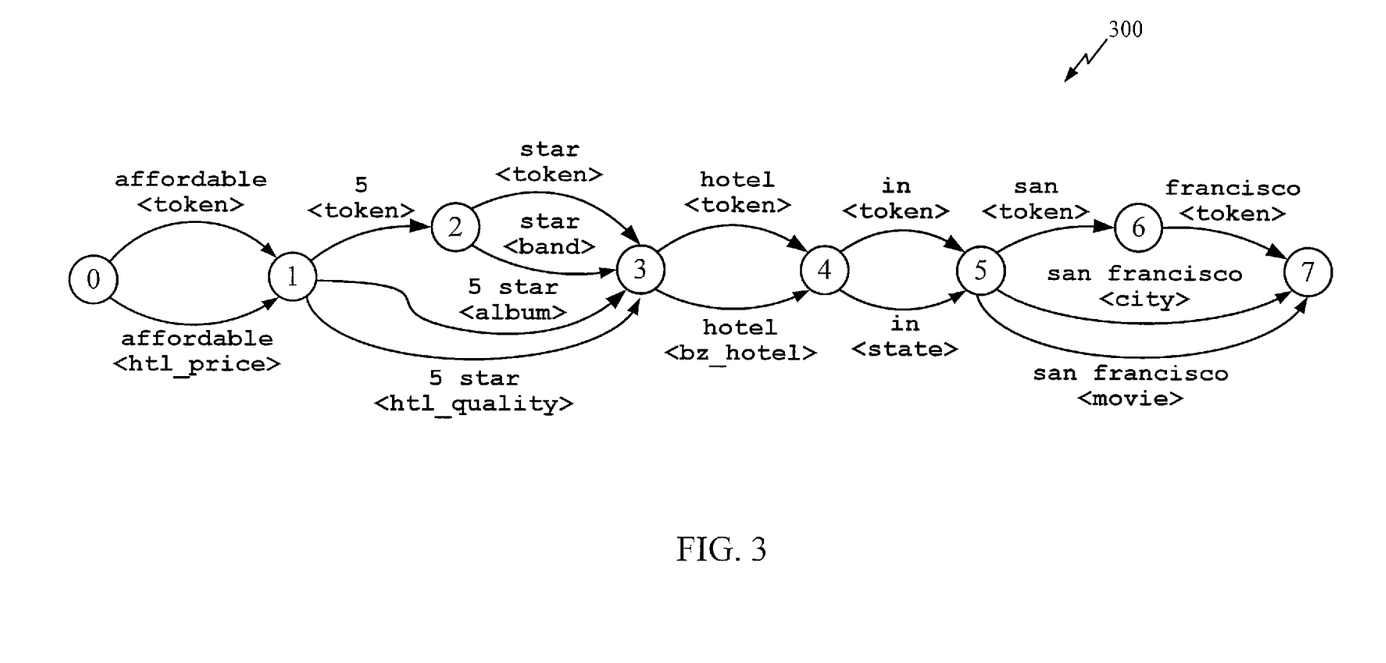
FIG. 3 is an implementation of an example directed graph.

An example directed graph 300 for the above search query generated to represent all or most of spans in the query is illustrated in FIG. 3. As will be seen, graph 300 may comprise an input to a suitable matching process, for example, which may specify a partially ordered set of atoms to concisely represent a set of input sequences to be matched or rejected via an applicable NDFA (e.g., NDFA 400 of FIG. 4, etc.). As seen, graph 300 may be representative of a partial ordering of candidate atoms extracted from the above search query, for example, such that every pass from 0 (zero) to 7 (seven) comprises one possible valid sequence of spans. Thus, without loss of generality, for a search query "$t_1 t_2 \ldots t_q$", a suitable directed graph with q+1 nodes may, for example, be generated. If a span covers "$t_i \ldots t_j$", then node i−1 may, for example, be connected to node j by adding an edge with span information. At times, graph 300 may be advantageously given as input to determine one or more suitable FSM, such as one or more NDFA, for example. In other words, as alluded to previously, instead of generating every possible pass through graph 300 as a sequence of atoms and having a recognizer to run each sequence separately, graph 300 may, for example, be used as input to determine an appropriate NDFA in a more effective or efficient manner. It should be noted, of course, that these are merely examples relating a particular implementation of a directed graph, and claimed subject matter is not so limited.

Referring back to process 200 of FIG. 2, at operation 206, all possible matching sequences of candidate atoms may, for example, be generated based, at least in part, on a partially ordered set of candidate atoms (e.g., graph 300 of FIG. 3, etc.). To illustrate, attention is now drawn to FIG. 4, which is an example of an NDFA 400 for the above hotel-related pattern, for example, according to an implementation. As alluded to previously, NDFA 400 may, for example, be determined by one or more Jabba rules (e.g., example rules may be compiled into NDFA 400). As was indicated, each transition edge of NDFA 400 may, for example, determine whether a span could satisfy a suitable criterion. In some instances, a backtracking algorithm or approach may be utilized, at least in part, to find all Jabba matched interpretations. For example, backtracking may occur as NDFA 400 finds one or more matches in an input atom sequence rather than in an action handling (e.g., after one or more matches are found, etc.) so as to minimize computation.

Figure 4:
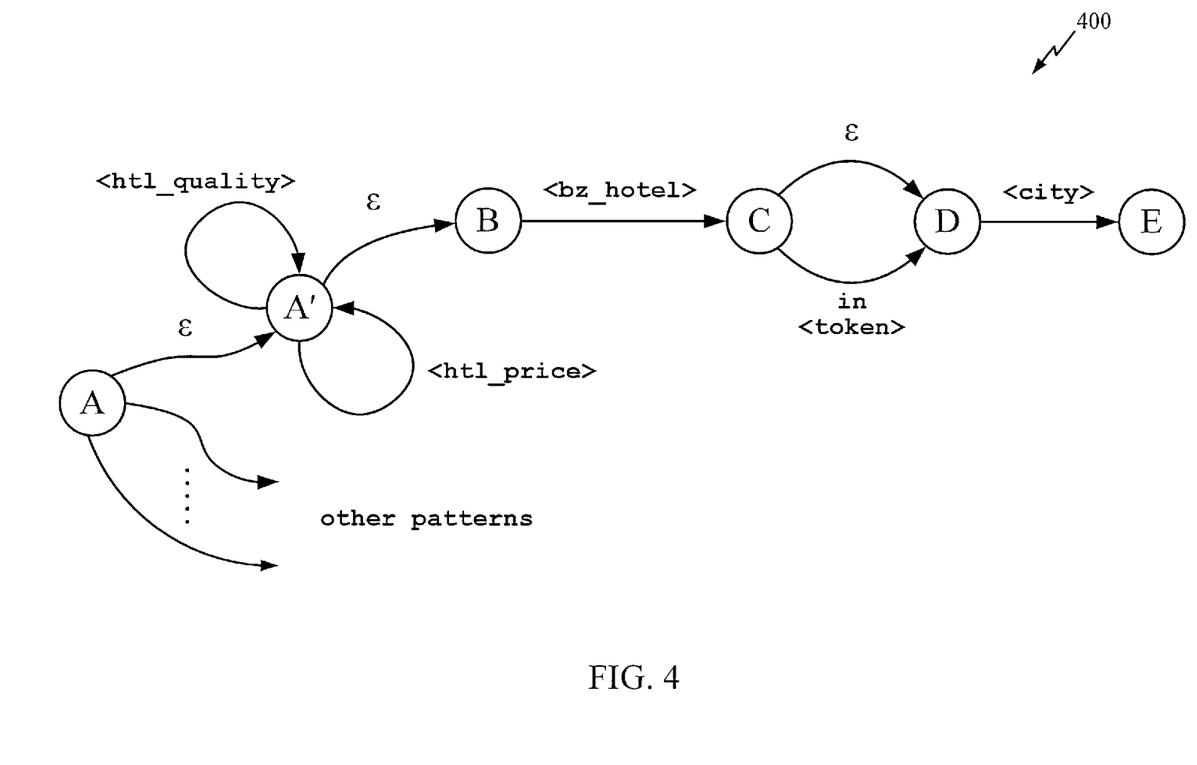
FIG. 4 is an implementation of an example NDFA.

Each state on an applicable traversal tree may correspond to or comprise a pair of nodes on an associated span graph (e.g., graph 300 of FIG. 3, etc.) and an NDFA, such as NDFA 400, for example. Here, if some span is found to be matched with a transition edge, a state may be moved forward. Thus, a Jabba rule characterizing a suitable pattern may, for example, be triggered if NDFA reaches a state in which both nodes comprise end points. A path on a suitable span graph may then be converted to an interpretation. For this example, a state transition path may comprise, for example, (A,0)→(A',0)→(A',1)→(A',3)→(B,3)→(C,4)→(D,5)→(E,7), just to illustrate one possible implementation. A corresponding interpretation may, for example, comprise "affordable <htl_price> 5 star <htl_quality> hotel <bz_hotel> in <token> san francisco <city>". Of course, these are merely examples to which claimed subject matter is not limited.

As previously mentioned, in addition to text processing or matching, in some instances, Jabba library may, for example, extract one or more useful slots from a search query. To facilitate this, more information with respect to a Jabba-type FSM (e.g., NDFA, etc.) may, for example, be needed or otherwise useful. For example, Jabba actions may be used, at least in part, to add one or more annotations to a sequence of candidate atoms as a whole. Typically, language processing annotations may comprise attributes on a text fragment, which may be less useful with respect to capturing intent of users, for example, particularly for direction or travel-type (e.g., origin-destination, etc.) search queries, since candidate atoms may have the same class (e.g., "place_name," etc.). Thus, here, annotations on an entire sequence that describe a functionality of each individual atom (e.g., for "origin" and for "destination," etc.) may, for example, be advantageously implemented.

Figure 5:
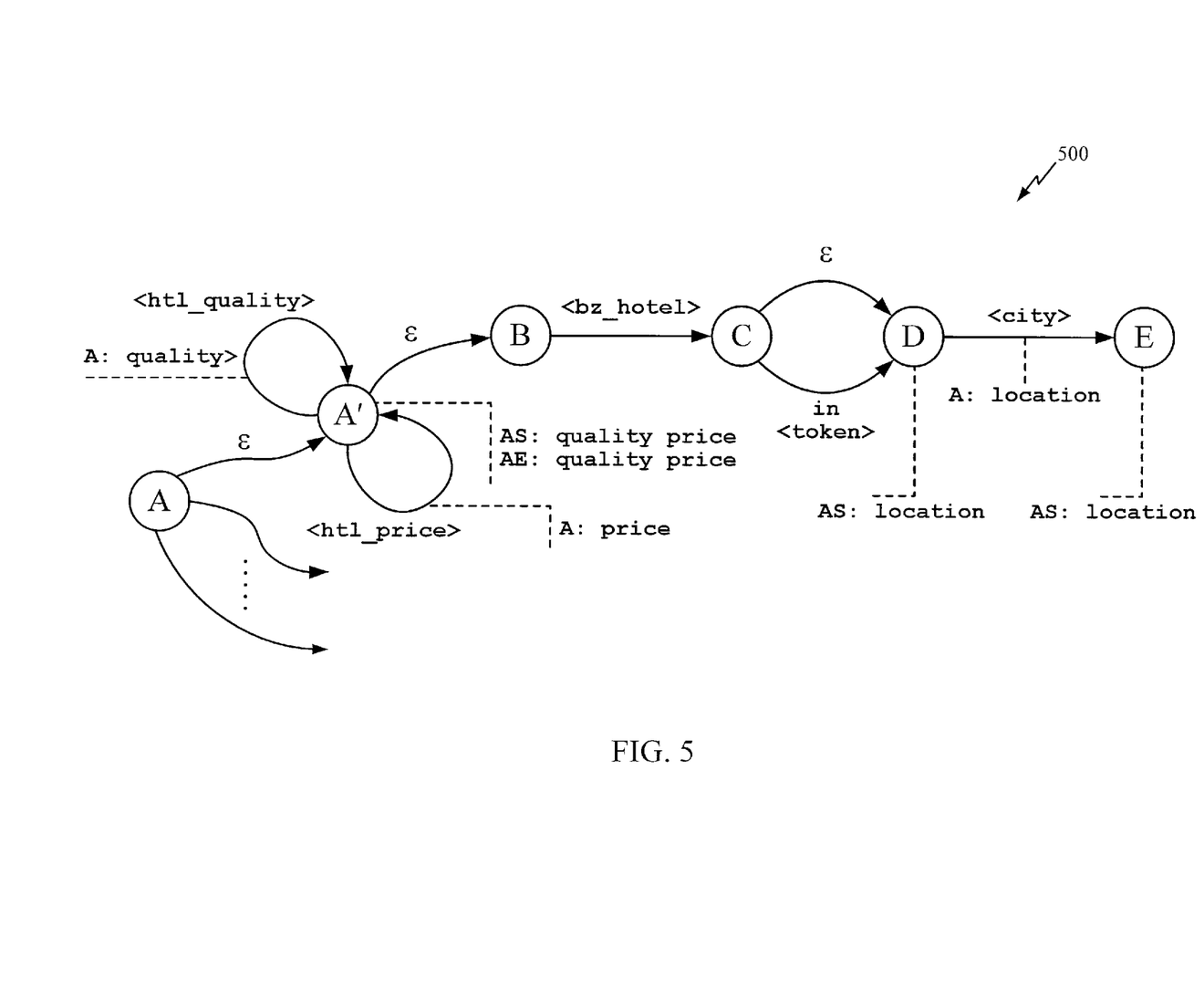
FIG. 5 is an implementation of an example annotated NDFA.

In one particular simulation or experiment, Jabba annotations for the above hotel-related pattern included those illustrated in an NDFA 500 of FIG. 5. Again, it should be appreciated that nodes, edges, annotations, etc. shown are merely examples to which claimed subject matter is not limited. As seen, for a Jabba term "<city>#location", an "AS" tag may be added to node D (e.g., where match of a term <city> starts), an "AE" tag may be added to node E (e.g., where match of the term ends), and an "A" tag may be added to all transition edges that the slot may possibly go through. Slotted terms, such as "<htl_quality>#quality" and "<htl_price>#price" may, for example, be processed in the same or similar way, except that a beginning node and an ending node may be identical.

Having transitioned to an ending node, all or most slotting assignments may, for example, be constructed. Here, a valid slot may comprise a path on NDFA 500, whose two ends are nodes attached with "AS"/"AE" tags of the slots, respectively. As also illustrated, all transition edges may be marked by an "A" tag. More specifically, for the hotel-related example above, (D,5)→(E,7) may comprise, for example, a fraction of a matched path. Thus, an "AS: location" tag on node D and an "AE: location" tag on node E may be found via an edge with a tag "A: location". This may indicate that a location slot is valid, for example, and that its value "san francisco" on a span graph may be found.

In some instances, to improve or affect in some manner a performance of a Jabba library, one or more optimization operations may be performed. For example, depending on an implementation, branch cutting or equivalent node merging may be applied after a suitable directed graph (e.g., graph 300 of FIG. 3, etc.) has been generated. Namely, with respect to branch cutting, a set of dead states during backtracking that may never reach end points may be maintained. As such, one or more dead states may be immediately abandoned or otherwise ignored if again encountered. This approach may provide benefits for syntax that matches any span (e.g., the term ".", etc.), since such syntax may create a number of less useful branches. With respect to equivalent node merging, if two nodes in an NDFA represent identical state (e.g., match the same pattern, create the same slots, etc.), these nodes may be merged together. This operation may also help to reduce a number of branches.

Accordingly, as discussed herein, a machine for recognizing or generating Jabba-type sequences may provide benefits. For example, while functioning or acting as a sequence recognizer, a client may pass a sequence of atoms to a Jabba-type machine. The machine may, for example, use an atom sequence to traverse an applicable graph in depth-first order to find a match with a rule. If a sequence ends in a final state, an object containing all actions associated with a rule match may, for example, be returned to the client via a callback. A callback mechanism, thus, may allow a client to control some or all of matching semantics (e.g., stop after the first match, find one match per rule, find all matches, etc.), as was indicated. Also, as a recognizer, a Jabba-type machine may, for example, enable more sophisticated matching of text than RE, GSL, etc. Since a definition of a Jabba atom is more versatile and, thus, more suited to structured text than RE or GSL, a Jabba-type machine may allow for more effective or efficient development of matching tasks that may otherwise be labor-intensive.

In addition, as illustrated, while functioning or acting as a sequence generator, a Jabba-type machine may more effectively or efficiently find all matching sequences given a set of candidate atoms. For example, a client may pass in a set of atoms along with ordering criteria to a Jabba-type machine. The machine then may traverse an applicable graph to discover all sequences that match one or more compiled Jabba patterns, for example. Here, a callback mechanism may also be used, at least in part, to inform the client, thus, allowing the client to control semantics. As previously mentioned, a Jabba-type machine may be advantageously employed in a number of text processing or matching applications, such as if one or more sequences of candidate atoms are not known a priori. Thus, a generator functionality of a Jabba-type machine may, for example, traverse an applicable graph in such a way as to follow the minimum number of edges to find all possible matching sequences without generating any sequences that do not match. In addition, unlike in GSL or RE, here, sequence generation and matching may, for example, be implemented or performed concurrently or simultaneously. Of course, such a description of certain aspects of a recognizer or generator functionality of a Jabba-type machine and its benefits is merely an example, and claimed subject matter is not so limited.

Figure 6:
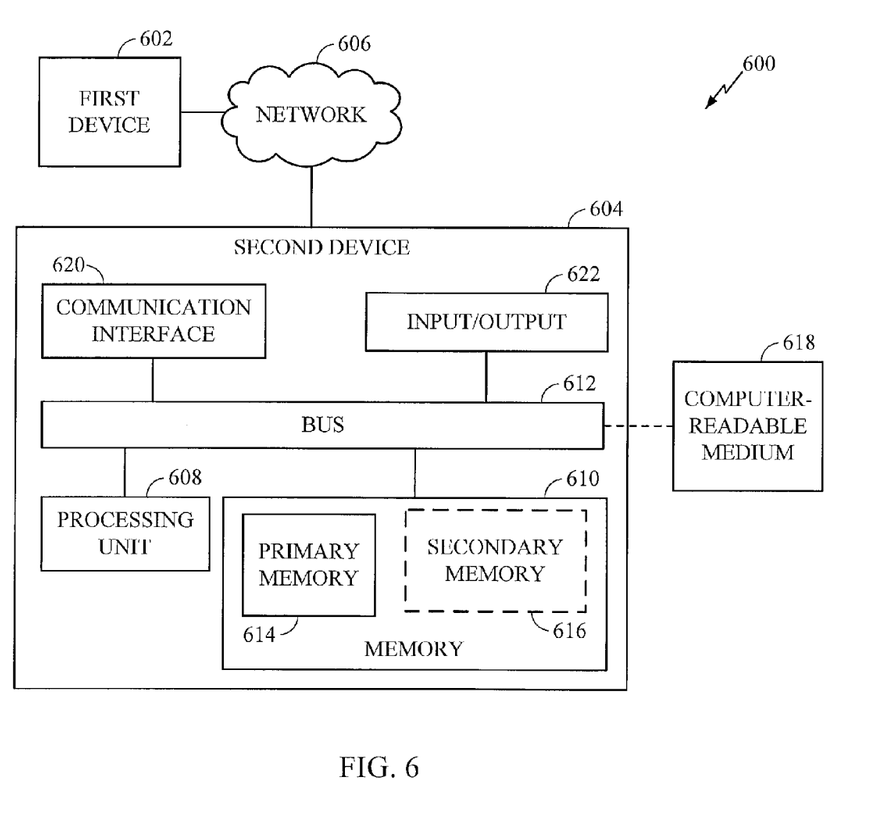
FIG. 6 is a schematic diagram illustrating an implementation of a computing environment associated with one or more special purpose computing apparatuses.

FIG. 6 is a schematic diagram illustrating an example computing environment 600 that may include one or more devices capable of implementing, in whole or in part, one or more processes or operations for a machine for recognizing or generating Jabba-type sequences, such as discussed above in connection with FIGS. 1-5, for example. Computing environment system 600 may include, for example, a first device 602 and a second device 604, which may be operatively coupled together via a network 606. In an embodiment, first device 602 and second device 604 may be representative of any electronic device, appliance, or machine that may have capability to exchange content or like signals over network 606. Network 606 may represent one or more communication links, processes, or resources having capability to support exchange or communication of content or like signals between first device 602 and second device 604.

Second device 604 may include at least one processing unit 608 that may be operatively coupled to a memory 610 through a bus 612. Processing unit 608 may represent one or more circuits to perform at least a portion of one or more applicable computing operations or processes. For example, depending on an implementation, processing unit 608 may facilitate or support electronically generating an in-memory representation of an AST based, at least in part, on one or more Jabba rules descriptive of one or more named terms, such as in a manner discussed above. In addition, in some instances, processing unit 308 may be capable of electronically generating a directed graph to determine one or more FSM comprising a plurality of states represented via one or more nodes of the directed graph corresponding to one or more match points along at least one sequence of candidate atoms and a plurality of transitions between the states based, at least in part, on the AST. This may, for example, facilitate or support electronically generating all possible matching sequences of candidate atoms based, at least in part, on a partially ordered set of these candidate atoms.

Memory 610 may represent any signal storage mechanism or appliance. For example, memory 610 may include a primary memory 614 and a secondary memory 616. Primary memory 614 may include, for example, a random access memory, read only memory, etc. In certain implementations, secondary memory 616 may be operatively receptive of, or otherwise have capability to be coupled to a computer-readable medium 618. In some instances, memory 610 or any portion thereof may comprise, for example, a non-transitory memory, as discussed below, and may be used, at least in part, for storing one or more Jabba patterns, tagged attributes, atom sequences, directed graphs, representations, or the like.

Computer-readable medium 618 may include, for example, any medium that may store or provide access to content or like signals, such as, for example, code or instructions for one or more devices in operating environment 600. It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of content, in whole or in part, in the form of zeros may change a state to represent content, in whole or in part, as binary digital electrical signals in the form of ones, to illustrate one possible implementation. As such, "non-transitory" may refer, for example, to any medium or device remaining tangible despite this change in state.

Second device 604 may include, for example, a communication adapter or interface 620 that may provide for or otherwise support communicative coupling of second device 604 to a network 606. Second device 604 may include, for example, an input/output device 622. Input/output device 622 may represent one or more devices or features that may be able to accept or otherwise input human or machine instructions, or one or more devices or features that may be able to deliver or otherwise output human or machine instructions.

According to an implementation, one or more portions of an apparatus, such as second device 604, for example, may store one or more binary digital electronic signals representative of content expressed as a particular state of a device such as, for example, second device 604. For example, an electrical binary digital signal representative of content may be "stored" in a portion of memory 610 by affecting or changing a state of particular memory locations, for example, to represent content as binary digital electronic signals in the form of ones or zeros. As such, in a particular implementation of an apparatus, such a change of state of a portion of a memory within a device, such a state of particular memory locations, for example, to store a binary digital electronic signal representative of content constitutes a transformation of a physical thing, for example, memory device 610, to a different state or thing.

Thus, as illustrated in various example implementations or techniques presented herein, in accordance with certain aspects, a method may be provided for use as part of a special purpose computing device or other like machine that accesses digital signals from memory or processes digital signals to establish transformed digital signals which may be stored in memory as part of one or more content files or a database specifying or otherwise associated with a suitable index.

Some portions of the detailed description herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other content storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described or shown herein using various methods or systems, it should be understood by those skilled in the art that various other modifications may be made, or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to particular examples disclosed, but that claimed subject matter may also include all implementations falling within the scope of the appended claims, or equivalents thereof.

What is claimed is:

1. A method comprising:
    electronically generating an in-memory representation of an abstract syntax tree comprising code-type constructs capable of evaluating input at edges of one or more non-deterministic finite state machines based, at least in part, on one or more Jabba-type rules descriptive of one or more named terms; and
    electronically generating a directed graph to determine said one or more non-deterministic finite state machines comprising a plurality of states represented via one or more nodes of said directed graph corresponding to one or more match points along at least one sequence of candidate atoms and a plurality of transitions between said states based, at least in part, on said abstract syntax tree.

2. The method of claim 1, and further comprising performing at least one matching operation with respect to said at least one sequence of said candidate atoms via depth-first order traversal of said directed graph based, at least in part, on at least one of said one or more finite state machines.

3. The method of claim 2, and further comprising electronically generating at least one object comprising all possible actions associated with said one or more named terms that match said at least one sequence of said candidate atoms.

4. The method of claim 1, and further comprising electronically generating all possible matching sequences of said candidate atoms based, at least in part, on a partially ordered set of said candidate atoms.

5. The method of claim 4, wherein said electronically generating said all possible matching sequences of said candidate atoms is performed by traversing said directed graph in an order that follows a minimum number of transitions of said plurality of transitions to locate said all possible matching sequences of said candidate atoms based, at least in part, on at least one of said one or more finite state machines.

6. The method of claim 1, wherein said at least one sequence of said candidate atoms is specified via at least one of the following: said one or more named terms; a search query; or any combination thereof.

7. The method of claim 1, wherein said one or more finite state machines comprises at least one non-deterministic finite state automaton (NDFA).

8. The method of claim 1, wherein said transitions correspond to edges of said directed graph and are representative of one or more possible next states of at least one of said one or more finite state machines.

9. The method of claim 1, and further comprising merging two or more of said plurality of states to a common state based, at least in part, on a determination that said two or more of said plurality of states are identical.

10. The method of claim 1, and further comprising performing an optimization operation on said abstract syntax tree.

11. The method of claim 10, wherein said optimization operation on said abstract syntax tree comprises at least one branch cutting operation.

12. The method of claim 1, wherein said directed graph represents all spans comprising a search query.

13. The method of claim 1, wherein said directed graph is used as input to said one or more finite state machines.

14. The method of claim 1, and further comprising adding at least one annotation to said at least one sequence of said candidate atoms as a whole based, at least in part, on said one or more named terms.

15. An apparatus comprising:
a computing platform comprising at least one processor to:
electronically generate an in-memory representation of an abstract syntax tree to comprise code-type constructs to be capable of evaluating input at edges of one or more non-deterministic finite state machines to be based, at least in part, on one or more Jabba-type rules descriptive of one or more named terms; and
electronically generate a directed graph to determine said one or more non-deterministic finite state machines to comprise a plurality of states represented via one or more nodes of said directed graph corresponding to one or more match points along at least one sequence of candidate atoms and a plurality of transitions between said states to be based, at least in part, on said abstract syntax tree.

16. The apparatus of claim 15, wherein said at least one processor further to perform at least one matching operation with respect to said at least one sequence of said candidate atoms via depth-first order traversal of said directed graph to be based, at least in part, on at least one of said one or more finite state machines.

17. The apparatus of claim 16, wherein said at least one processor further to electronically generate at least one object comprising all possible actions associated with said one or more named terms that match said at least one sequence of said candidate atoms.

18. The apparatus of claim 15, wherein said at least one processor further to electronically generate all possible matching sequences of said candidate atoms to be based, at least in part, on a partially ordered set of said candidate atoms.

19. An article comprising:
a non-transitory storage medium having instructions stored thereon executable by a special purpose computing platform to:
electronically generate an in-memory representation of an abstract syntax tree to comprise code-type constructs to be capable of evaluating input at edges of one or more non-deterministic finite state machines to be based, at least in part, on one or more Jabba-type rules descriptive of one or more named terms; and
electronically generate a directed graph to determine said one or more non-deterministic finite state machines to comprise a plurality of states represented via one or more nodes of said directed graph corresponding to one or more match points along at least one sequence of candidate atoms and a plurality of transitions between said states to be based, at least in part, on said abstract syntax tree.

20. The article of claim 19, wherein said non-transitory storage medium further includes instructions to electronically generate all possible matching sequences of said candidate atoms to be based, at least in part, on a partially ordered set of said candidate atoms.

\* \* \* \* \*